United States Patent
Herberholz et al.

(10) Patent No.: US 12,061,853 B2
(45) Date of Patent: Aug. 13, 2024

(54) MULTI-DIMENSIONAL NETWORK INTERFACE

(71) Applicant: Arm Limited, Cambridge (GB)

(72) Inventors: Rainer Herberholz, Great Abington (GB); Supreet Jeloka, Austin, TX (US)

(73) Assignee: Arm Limited, Cambridge (GB)

( * ) Notice: Subject to any disclaimer, the term of this patent is extended or adjusted under 35 U.S.C. 154(b) by 294 days.

(21) Appl. No.: 17/497,400

(22) Filed: Oct. 8, 2021

(65) Prior Publication Data
US 2022/0343045 A1 Oct. 27, 2022

Related U.S. Application Data

(60) Provisional application No. 63/177,595, filed on Apr. 21, 2021.

(51) Int. Cl.
*G06F 30/3312* (2020.01)
*G06F 111/04* (2020.01)
*G06F 119/12* (2020.01)

(52) U.S. Cl.
CPC ...... *G06F 30/3312* (2020.01); *G06F 2111/04* (2020.01); *G06F 2119/12* (2020.01)

(58) Field of Classification Search
CPC ............ G06F 30/3312; G06F 2111/04; G06F 2119/12; G06F 1/10; G06F 13/405; G06F 13/4204; G06F 9/30087; G06F 9/30101; H01L 25/0657; H01L 25/065; H01L 27/06; H03K 3/011; H03K 5/131; H03K 5/1504; H03K 3/037; H03K 5/14; H04B 1/40; H04B 1/44; H04L 49/253
See application file for complete search history.

(56) References Cited

U.S. PATENT DOCUMENTS

| | | | |
|---|---|---|---|
| 9,569,389 B2 * | 2/2017 | Jeon | G06F 13/382 |
| 9,716,487 B1 | 7/2017 | Kannan et al. | |
| 11,031,923 B1 * | 6/2021 | Elkanovich | H03K 3/0372 |
| 11,775,723 B1 * | 10/2023 | Chen | G06F 30/31 |
| | | | 716/124 |
| 2009/0020863 A1 * | 1/2009 | Choi | H01L 25/0657 |
| | | | 257/686 |
| 2012/0146693 A1 | 6/2012 | Lee et al. | |
| 2013/0038380 A1 * | 2/2013 | Cordero | G06F 1/10 |
| | | | 327/524 |
| 2013/0049827 A1 * | 2/2013 | Bucelot | G06F 1/10 |
| | | | 327/144 |

(Continued)

OTHER PUBLICATIONS

UKIPO Search Report; GB 2204029.9; Nov. 15, 2022.

*Primary Examiner* — Nha T Nguyen
(74) *Attorney, Agent, or Firm* — Pramudji Law Group PLLC; Ari Pramudji

(57) ABSTRACT

Various implementations described herein refer to a device having an integrated circuit with multiple tiers including a first tier and a second tier that are arranged vertically in a stacked configuration. The first tier may have first functional components, and the second tier may have second functional components. The device may have a three-dimensional (3D) connection within the first tier that allows for synchronous signaling between the first functional components and the second functional components for reducing latency between the multiple tiers including the first tier and the second tier.

14 Claims, 5 Drawing Sheets

(56) References Cited

U.S. PATENT DOCUMENTS

| | | |
|---|---|---|
| 2014/0145347 A1 | 5/2014 | Samadi et al. |
| 2015/0121327 A1 | 4/2015 | Kamal et al. |
| 2019/0266088 A1* | 8/2019 | Kumar ................. G06F 15/7825 |
| 2019/0266089 A1* | 8/2019 | Kumar ................. G06F 12/0813 |
| 2020/0105732 A1* | 4/2020 | Chandrasekar .. H03K 19/17796 |
| 2022/0200611 A1* | 6/2022 | Faisal ................. H03K 19/1774 |
| 2023/0013151 A1* | 1/2023 | Yin ................... H01L 23/49827 |

* cited by examiner

300

310
provide an integrated circuit with multiple tiers including a first tier and a second tier arranged vertically in a stacked configuration, wherein launch sequential elements in the first tier correspond to capture sequential elements in the second tier, and wherein launch sequential elements in the second tier correspond to capture sequential elements in the first tier

320
form timing paths that span across the multiple tiers between corresponding launch and capture sequential elements in the first tier and the second tier

330
enforce a register-transfer logic (RTL) policy that ensures a majority of combinational logic associated with the timing paths is co-located on a same tier as the launch sequential elements or the capture sequential elements in the first tier or the second tier

410 — provide an integrated circuit with multiple tiers including a first tier and a second tier arranged vertically in a stacked configuration, the first tier having first functional components, and the second tier having second functional components 420 — provide a three-dimensional (3D) connection that allows for synchronous signaling between the first functional components and the second functional components for reducing latency between the multiple tiers including the first tier and the second tier 430 — manufacture, or cause to be manufactured, the integrated circuit with the multiple tiers and the communication network

FIG. 4

MULTI-DIMENSIONAL NETWORK INTERFACE

RELATED APPLICATIONS

This application claims priority to and the benefit of Patent Application No. U.S. 63/177,595, filed 2021 Apr. 21, titled "Methods for Low Latency Connection of Components to a Network in a 3D-IC", and which is hereby incorporated by reference in its entirety.

BACKGROUND

This section is intended to provide information relevant to understanding various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

In some modern circuit designs, requirements for additional circuit area to form digital logic, memory and communication interfaces exceed a rate of density improvements in process technology. This leads to growth in chip area and limits systems design in 2D. As a mitigation, chip manufacturing technology enables tightly integrated three-dimensional (3D) system designs. Some known techniques have attempted to partition circuit blocks between different dies by placing asynchronous domain crossings at interfaces so as to keep any timing paths entirely confined to each of the dies in 3D system designs, thereby guaranteeing robust timing at a cost of additional latency for an asynchronous interface. Some demonstrations of 3D system designs have attempted to utilize a synchronous clock-tree in 3D integrated circuitry (3DIC) so as to thereby enable u-architectural splitting of functional blocks between multiple 3D tiers. However, the timing of paths extending between different dies of a 3D system is exposed to differences in global process skews between 3D tiers, which makes this approach prone to low yield in volume manufacturing. As such, there exists a need to improve circuit designs that reduce traffic latency while ensuring robust timing closure considering global process variation between the 3D tiers.

BRIEF DESCRIPTION OF THE DRAWINGS

Implementations of various architectural and circuit design schemes and techniques are described herein with reference to the accompanying drawings. It should be understood, however, that the accompanying drawings illustrate only various implementations described herein and are not meant to limit embodiments of various techniques described herein.

FIG. 3 illustrates a diagram of a method for providing multi-dimensional network connection architecture in accordance with implementations described herein.

FIG. 4 illustrates a diagram of a method for providing multi-dimensional network connection architecture in accordance with implementations described herein.

DETAILED DESCRIPTION

Figure 1A:
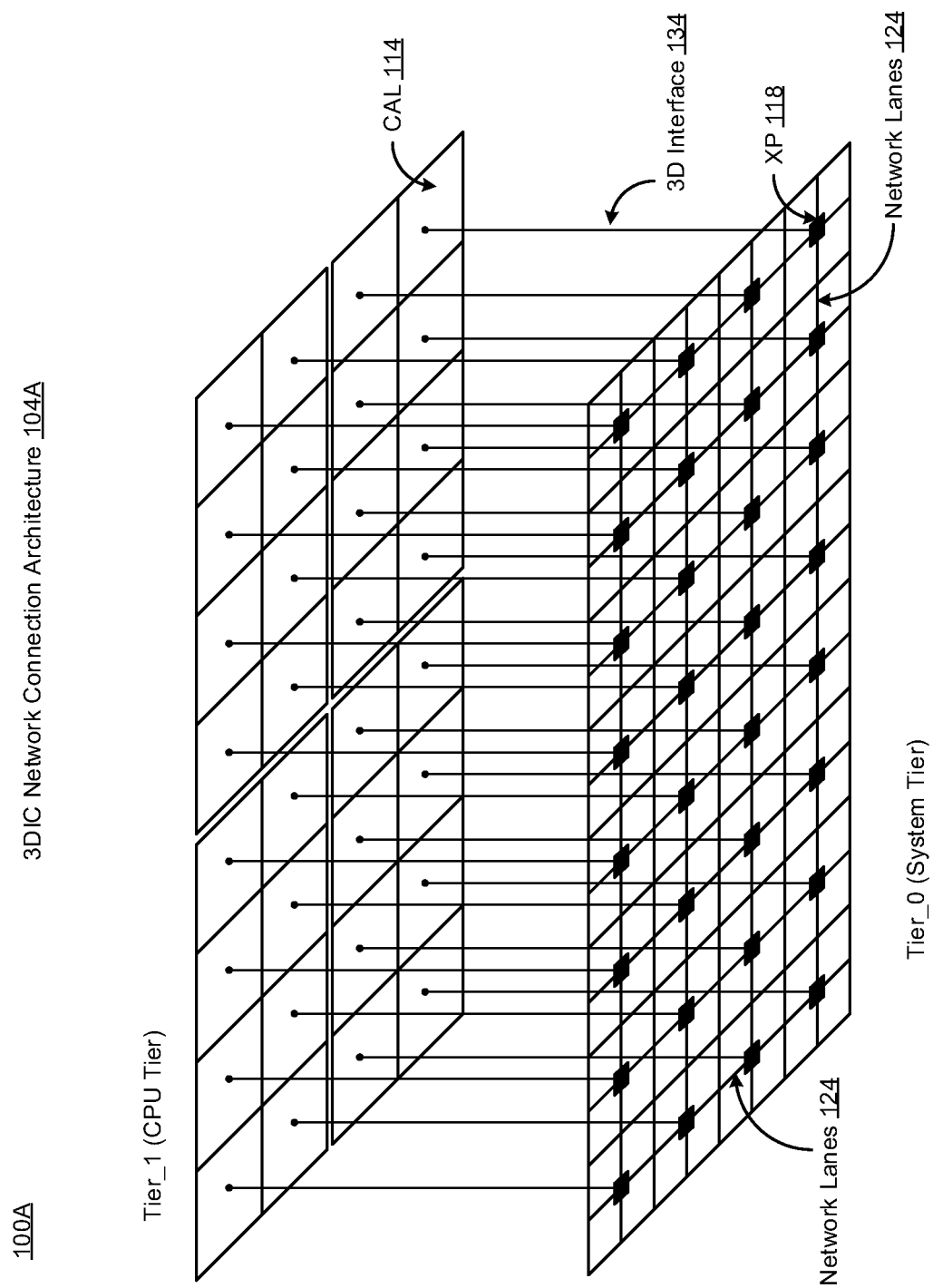
FIGS. 1A-1B illustrate various diagrams of multi-dimensional network connection architecture in accordance with various implementations described herein.

Various implementations described herein are directed to integrated circuitry that provides for multi-dimensional network connection schemes and techniques for supporting three-dimensional (3D) interconnect circuitry related applications in reference to 3D physical circuit designs. The multi-dimensional network connection architecture may provide for 3D interconnect circuitry that is implemented with a multi-tiered structure configured for various 3D networking applications. Various implementations described herein provide for a method of partitioning system components by way of connecting them with low latency between 3D-stacked die. The various schemes and techniques described herein address limitations associated with availability of interconnects due to area constraints versus the latency introduced at a 3D boundary under the constraint that stacked dies may be fabricated in different process technologies, and in that each stacked die may be parametrically skewed independently.

Various implementations described herein provide for a method of implementing low latency connections between a communication network and individual components over a 3D interface, whereby the clock phase of interface signals is treated differently according to a direction of latency-sensitive communication supported by a part of the design, such as transmit from the component to the network (TX) or receive from the network to the component (RX). In some instances, signals within the TX or RX part of the design, respectively, are passing in the opposite direction or are crossing between transmit (TX) and receive (RX). Such paths are deemed non-latency sensitive and may be defined as multi-cycle paths to meet synchronous timing, which should be met over all different conditions of process skew between the 3D tiers. Alternatively, re-synchronization may be performed for these paths. Also, guidelines for register-transfer-logic (RTL) designs may be defined so as to facilitate partitioning integrated circuitry into 3D tiers, which may be met by a majority of timing paths: Also, in some instances, networking components do not contain flip-flops on all in- and outputs to minimize latency. In this case the location of flip-flops should be consistent for all components and following a convention to locate flip-flops either at the input or output of the components, to keep timing paths within a single tier wherever possible so as to minimize impact of delay divergence. Also, in some instances, a method to improve timing closure for such paths that cannot meet RTL guidelines by redistribution of logic gates across a 3D boundary, thereby splitting a functional component across two 3D tiers, at the cost of increasing the number of 3D interfaces that are needed. The methods described herein involve keeping a restricted subset of the circuitry of between 3D stacked die synchronous and on the same source voltage supply.

Various implementations of multi-dimensional network connection architecture will be described herein with reference to FIGS. 1A-1B and 2-4.

Figure 1B:
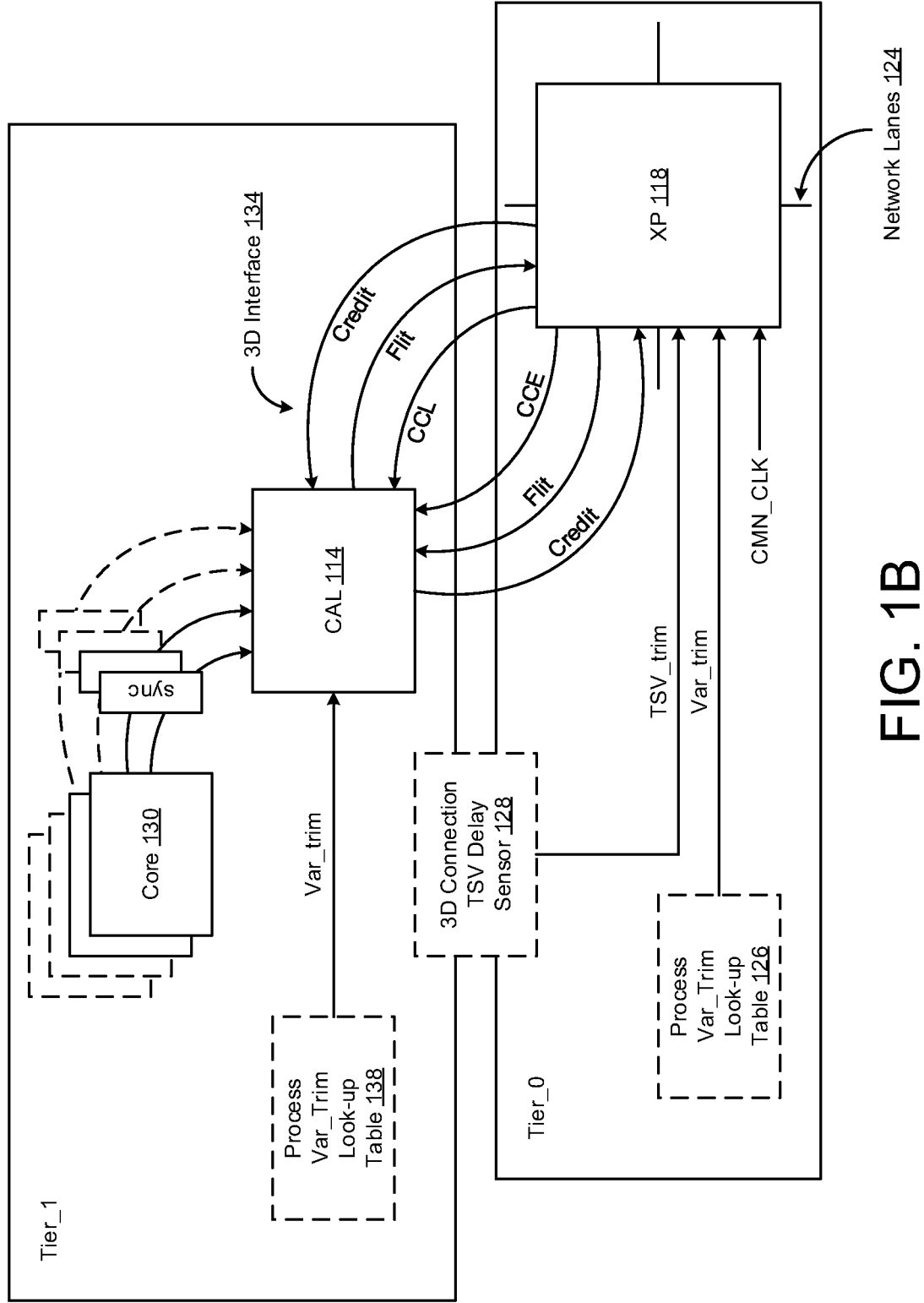

FIGS. 1A-1B illustrate various diagrams of multi-dimensional network connection architecture in accordance with implementations described herein. In particular, FIG. 1A shows a diagram 100A of multi-dimensional network connection architecture 104A with a multi-tiered structure, and FIG. 1B shows a diagram 100B of multi-dimensional network connection architecture 104B with another multi-tiered structure.

In various implementations, the multi-dimensional network connection architecture may be implemented with various integrated circuit (IC) components that are arranged and coupled together as an assemblage or some combination of parts that provide for physical circuit designs and related structures. In some instances, a method of designing, providing, fabricating and/or manufacturing multi-dimensional network connection architecture may involve use of IC circuit components described herein so as to implement various related fabrication schemes and techniques associated therewith. Moreover, the multi-dimensional network connection architecture may be integrated with various computing circuitry and/or components on multiple chips, and also, the multi-dimensional network connection architecture may be implemented in various embedded applications for automotive, mobile, server and also Internet-of-things (IoT).

FIG. 1A shows the diagram 100A of the multi-dimensional network connection architecture 104A with the multi-tiered structure, wherein similar components and/or circuits along with features, characteristics and/or behaviors are similar in scope with respect to the multi-dimensional network connection architecture 104B shown in FIG. 1B. Generally, the arrangement shown in FIG. 1B is repeated multiple times within the network.

As shown in FIG. 1A, the multi-dimensional (3D) network connection architecture 104A may refer to a device having an integrated circuit along with a multi-tiered structure and multiple tiers including the first tier (Tier_0) and the second tier (Tier_1) arranged vertically in a stacked configuration. The first tier (Tier_0) may refer to a system tier and have the first functional components, such as, e.g., multiple network routers (XP) 118 that are arranged in a grid pattern with the network lanes 124 disposed therebetween. The second tier (Tier_1) may refer to a CPU tier and have the second functional components, such as, e.g., one or more network multiplexers (CAL) 114 that are arranged in a grid pattern with the 3D network interface 134 disposed therebetween. As previously described herein, each of the one or more network multiplexers (CAL) 114 are configured to concentrate multiple network ports into a single network port. The use of a multiplexer (CAL) in a 3D network connection may be used to limit the number of 3D signal-connections required and hence to limit the area required to implement the 3D interface. Also, the device may include the communication network in the first tier (Tier_0) with the network lanes 124 that run between network cross-points. In various implementations, synchronous signaling via the 3D interface 134 may be configured to meet timing constraints over different conditions of different global process skew (or corners) associated with the multiple tiers (Tier_0, Tier_1) including different process technology nodes (or generations).

In some implementations, the network lanes 124 run between network cross-points, such as, e.g., between two cross-points. In some instances, a cross-point may be inserted along a network lane to provide a 3D connection point. Depending on use, the 3D interface 134 may be placed along one or more network lanes 124, in which case there may be only two network lanes 124 that are connected to the XP/CAL 118,114 or at a full-cross XP 118 with the network lanes 124 to neighboring XPs 118 in four directions.

As shown in FIG. 1B, the multi-dimensional (3D) network connection architecture 104B may refer to a device having an integrated circuit along with a multi-tiered structure and multiple tiers including a first tier (Tier_0) and a second tier (Tier_1) arranged vertically in a stacked configuration. The first tier (Tier_0) may have first functional components, and the second tier (Tier_1) may have second functional components. In some implementations, the first functional components may comprise a network router, such as, e.g., XP 118, and also, the second functional components may comprise a network multiplexer, such as, e.g., CAL 114, that is configured to concentrate multiple network ports into a single network port. Also, the device may include a 2D communication network in the first tier (Tier_0) with network lanes 124 and network ports within the router that allow for synchronous signaling via a 3D interface 134 between the first functional component 118 in the first tier (Tier_0) and the second functional component 114 in the second tier (Tier_1) for reducing latency between the multiple tiers including the first tier (Tier_0) and the second tier (Tier_1). In some implementations, synchronous signaling via the 3D interface 134 may be configured to meet timing constraints over different conditions of different global process skew (or corners) associated with the first tier (Tier_0) and the second tier (Tier_1) including different process technology nodes (or generations).

In some implementations, the 3D interface 134 provides for synchronous signaling between the network multiplexer 114 in the second tier (Tier_1) and the network router 118 in the first tier (Tier_0). The 3D interface signals may include flit signals and associated credit signals whereby flit signals pass in a first direction from the first tier (Tier_0) to the second tier (Tier_1), and the 3D interface signals may include flit signals and associated credit signals whereby flit signals pass in a second direction from the second tier (Tier_1) to the first tier (Tier_0). In each case credit signals pass in the direction opposite to the flits signals they are associated with the 3D interface signals may include a forwarded common-clock-early (CCE) and a common-clock-late signal (CCL) that pass in the first direction from the first tier (Tier_0) to the second tier (Tier_1). Also, the network router 118 in the first tier (Tier_0) may receive a common clock signal (CMN_CLK) that is used to generate the common-clock-early signal (CCE) and the common-clock-late signal (CCL). In some instances, the CMN_CLK may be forwarded to the CAL, and the CCE and CCL may be generated by the CAL. Generally, a flit refers to a unit of data payload that needs to be moved quickly, and also, a credit refers to an electronic token that indicates a number of flits that a downstream network component is able to receive (without overflow). Moreover, the use of credits may prevent the need to handshake each transmission.

In various implementations, the communication network may refer to a three-dimensional (3D) interface whereby a clock phase used to launch or capture network lane signals (e.g., flits) may be adjusted differently for the 3D interface signals 134 that are sensitive to latency according to a direction of communication. Also, the clock phase may be adjusted to increase a timing window available to latency sensitive paths and compensate non-latency sensitive paths with design changes by inserting extra registers and/or synchronizers. Also, the clock phase may be adjusted by including tunable (or trimmable) timing delay circuitry that is tuned (or trimmed) based on various inputs (e.g., Var_trim, TSV_trim) from at least one of process variation tables 126, 138 and 3D connection delay sensors, such as, e.g., thru-silicon via (TSV) delay sensors 128.

In some implementations, the network lanes may refer to connections between the various XPs 118 on the lower tier (Tier_0), and also the network lanes may be used to transport flits that are forwarded to the second functional components 114 located in the upper tier or second tier (Tier_1). In various instances, many of these flits are latency critical, wherein the network lanes refer to lanes that connect cross-points. In some instances, a flit carried on a network lane is routed based on its address information, and if the address corresponds to a device attached over the 3D interface, then the flit will be routed that way.

In some implementations, the network connection architecture 104A may include one or more processing cores 130 disposed in the second tier (Tier_1), and also, the cores 130 may operate asynchronous to the network and be re-synchronized to communicate with the network multiplexer 114 with use of one or more synchronizers (sync). In some scenarios, the cores 130 are configured to asynchronously communicate with the network router 118 disposed in the first tier (Tier_0) by way of the network multiplexer 114 and the 3D interface 134.

As described herein and shown in FIG. 1A, the multi-dimensional (3D) network connection architecture 104A may have multiple tiers including the first tier (Tier_0) and the second tier (Tier_1). In various other implementations, the multi-dimensional (3D) network connection architecture 104A may have the multiple tiers along with one or more additional tiers, and thus, in this instance, the communication network provides additional synchronous signaling between additional functional components in the one or more additional tiers for reducing latency between the first tier (Tier_0), the second tier (Tier_1) and the one or more additional tiers, such as, e.g., a third tier, a fourth tier, etc.

Figure 2:
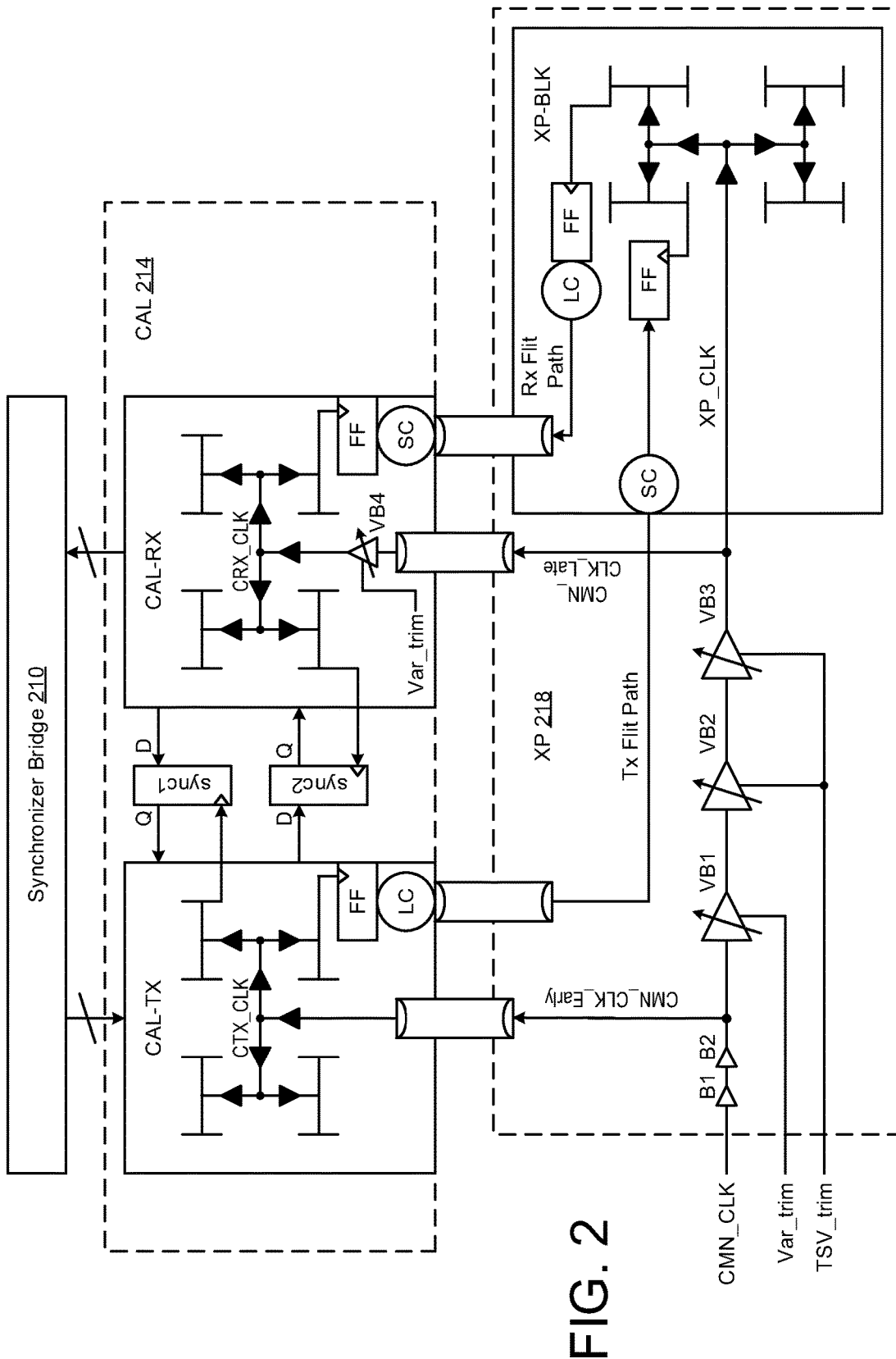
FIG. 2 illustrates a diagram of multi-dimensional interface clock architecture in accordance with various implementations described herein.

FIG. 2 illustrates a diagram 200 of multi-dimensional (3D) interface clock architecture 204 with the multi-tiered structure, wherein similar components and/or circuits along with features, characteristics and/or behaviors are similar in scope with respect to the multi-dimensional network connection architecture 104A, 104B shown in FIGS. 1A-1B.

In various implementations, the multi-dimensional interface clock architecture may be implemented with various integrated circuit (IC) components that are arranged and coupled together as an assemblage or some combination of parts that provide for physical circuit designs and related structures. In some instances, a method of designing, providing, fabricating and/or manufacturing multi-dimensional interface clock architecture may involve use of IC circuit components described herein so as to implement various related fabrication schemes and techniques associated therewith. Moreover, the multi-dimensional interface clock architecture may be integrated with various computing circuitry and/or components on multiple chips, and also, the multi-dimensional interface clock architecture may be implemented in various embedded applications for automotive, mobile, server and also Internet-of-things (IoT).

As shown in FIG. 2, the 3D interface clock architecture 204 may refer to a device having a 3D integrated circuit (3DIC) along with a multi-tiered structure and multiple tiers including the first tier (Tier_0) and the second tier (Tier_1) that are arranged vertically in a stacked configuration. The first tier (Tier_0) may refer to the system tier and have the first functional components, such as, e.g., the multiple network routers (XP) 218. The second tier (Tier_1) may refer to the CPU tier and have the second functional components, such as, e.g., the network multiplexers (CAL) 214. As previously described herein, each of the one or more network multiplexers (CAL) 214 are configured to concentrate multiple network ports into a single network port. Also, the device may include the communication network in the first tier (Tier_0) with the network lanes that allow for synchronous signaling via cross-points between the first functional components 218 in the first tier (Tier_0). In various implementations, synchronous signaling via the 3D interface may be configured to meet various timing constraints over different conditions of different global process skew (or corners) that are associated with the multiple tiers (Tier_0, Tier_1) including different process technology nodes (or generations).

In some implementations, the network multiplexer (CAL) 214 may have a transmit clock tree (CAL-TX) that applies to registers (flip-flop) on the latency-critical paths into the XP 218, and also, the network multiplexer (CAL) 214 may have a receive clock tree (CAL-RX) that applies to registers (flip-flop) on the latency-critical paths from the XP 218. Timing paths where launch and capture clocks are CAL-TX and CALR-RX or CAL-RX and CAL-TX may include additional synchronizers (sync1, sync2) or be modified as multi-cycle paths in the design such as to enable robust timing closure. Such timing paths are deemed non-latency critical. Timing paths launched from the CAL-RX and captured in the XP, as well as timing paths launched from the XP and captured using CAL-TX, may contain additional synchronizers or be modified as multi-cycle paths. Such timing paths are also not deemed latency-critical. In various instances, the CAL-TX and CAL-RX parts of the network multiplexer (CAL) 214 may be configured to bi-directionally communicate asynchronously with other functional components in the second tier via one or multiple synchronizer bridges 210. In some instances, the terms early/late are used for the clock phase with respect to a reference phase of the clock in the XP 218, wherein the clock phases may be generated on the XP side and consider the additional phase shift of the 3D interface to make them correct as they arrive in the CAL 214. Alternatives are possible whereby the circuitry arriving at the final phase correction is located in the CAL 214. The CAL-TX may receive a common-clock-early signal (CMN_CLK_Early) from the network router (XP) 218, and also, the CAL-TX may have a flip-flop (FF) coupled to the network router (XP) 218 by way of a large cloud (LC) of combinational logic. Also, the CAL-RX may receive a common-clock-late signal (CMN_CLK_Late) from the network router (XP) 218, and also, the CAL-RX may have a flip-flop (FF) coupled to the network router (XP) 218 by way of a small cloud (SC) of combinational logic. A timing path is between a launch-and-capture flip-flop passing through the combinational logic, wherein each flip-flop refers to a start/end point of multiple timing paths. Also, the number of combinational logic gates on each timing path refers to the size of the cloud, whereby a timing path comprising of a small number of combinational logic gates is referred to a small cloud (SC) and a timing path comprising a large number of gates associated with longer time for signal propagation is described as a large cloud (LC).

In some implementations, the network router (XP) 218 may refer to a router block (XP-BLK) with a clock tree that receives a common-clock signal (CMN_CLK) by way of one or more input buffers (B1, B2) and one or more variable trimming buffers (VB1, VB2, VB3) that are controlled with the variable trimming signal (Var_trim) and/or the variable TSV signal (TSV_trim). This configuration may be used for the generation of the different clock phases for the case that the related circuitry is located on the XP side, as shown in FIG. 2. In some instances, each XP in the system needs to have clock buffers to ensure signaling on the network lanes between XPs. The CMN_CLK signal may be provided to the CAL-TX of the network multiplexer 214 by way of the input buffers (B1, B2) as the CMN_CLK_Early signal, and the CMN_CLK signal may experience the delay introduced by the 3D interface and associated lateral routing on each of the tiers. Also, the CMN_CLK signal is provided to a first variable trimming buffer (VB1), which is controlled by the variable trimming signal (Var_trim). The first variable trimming buffer (VB1) provides an output signal to a second variable trimming buffer (VB2), which is controlled by the variable TSV signal (TSV_trim), whereby the delay of VB2 and VB3 represents the delay associated with one pass over the 3D interface. The second variable trimming buffer (VB2) provides an output signal to the third variable trimming buffer (VB3) as the CMN_CLK_Late signal, which is also controlled by the variable TSV signal (TSV_trim). The third variable trimming buffer (VB3) provides an output signal to the CAL-RX and XP-BLK, and the CAL-RX may have a variable trimming buffer (VB4) that receives the CMN_CLK_Late signal from the VB3 in the XP 218. Also, the CAL-TX may have its flip-flops (FF) coupled to the XP-CLK by way of a large cloud (LC) of combinational logic and/or the small cloud of combinational logic.

In some implementations, CAL-TX may provide a transmit signal (Representative Tx Flit Path) to the small cloud (SC) of combinational logic by way of the flip-flop (FF) and the large cloud (LC) of combinational logic. In some instances, the representative Tx flit path starts from the Q port of flip-flop on CAL_TX with a large portion of combination logic within CAL_TX (shown as LC) and goes through the 3D connection to the other tier, where it enters smaller combinational logic (SC) on the XP_BLK, which in turn in sampled by the flip-flop in XP_BLK. Also, in some instances, the XP-BLK may provide a receive signal (Representative Rx Flit Path) to the CAL-RX by way of the output flip-flop (FF), the large cloud (LC) of combinational logic and/or the small cloud (SC) of combinational logic. In some instances, the representative Rx flit path is opposite to the Tx flit path and starts from a flop in the XP_BLK, goes to LC, then SC, and then is sampled by a flop in CAL_RX. In reference to FIG. 2, the large cloud (LC) circuitry and the small cloud (SC) circuitry refer to combinatorial logic of each of the functional blocks, and as such, the LC and SC reside fully inside the boundary of each corresponding functional block. Also, in various implementations, the 3DIC network connection schemes and techniques described herein seek to constrain most or almost all of the combinational logic within a timing path on one single tier, such as, e.g., the first tier (Tier_0). Also, in reference to the CAL-TX, a clock transmit signal (CTX_CLK) may be generated and provided to the flip-flop (FF) at the large cloud (LC) and also to the sync1 flop, and in reference to the CAL-RX, a receive clock signal (CRX_CLK) may be generated and provided to the flip-flop (FF) at the small cloud (SC) and also to the sync2 flop. Further, in reference to the XP-BLK, clock signals may be provided to the flip flops (FFs) at the large cloud (LC) and the small cloud (SC).

FIG. 3 illustrates a diagram of a method 300 for providing multi-dimensional (3D) network connection architecture in accordance with implementations described herein.

It should be understood that even though method 300 indicates a particular order of operation execution, in some cases, various portions of operations may be executed in a different order, and on different systems. In other cases, additional operations and/or steps may be added to and/or omitted from method 300. Also, method 300 may be implemented in hardware and/or software. For instance, if implemented in hardware, method 300 may be implemented with components and/or circuitry, as described in FIGS. 1A-1B and 2. In other instances, if implemented in software, method 300 may be implemented as a program or software instruction process that is configured for providing multi-dimensional (3D) network connection architecture, as described herein. Also, if implemented in software, instructions related to implementing method 300 may be stored in memory and/or a database. Therefore, in various implementations, a computer or various other types of computing devices with a processor and memory may be configured to perform method 300.

As described in reference to FIG. 3, the method 300 may be used for fabricating and/or manufacturing, or causing to be fabricated and/or manufactured, an integrated circuit (IC) that implements various layout schemes and techniques in physical design as described herein so as to thereby provide multi-dimensional (3D) network connections using various related devices, components and/or circuitry as described herein.

At block 310, method 300 may provide an integrated circuit having multiple tiers including a first tier and a second tier arranged vertically in a stacked configuration, wherein launch sequential elements in the first tier form a combinational path to capture sequential elements in the second tier, and wherein launch sequential elements in the second tier correspond to capture sequential elements in the first tier. Also, at block 320, method 300 may form timing paths that span across the multiple tiers between corresponding launch and capture sequential elements in the first tier and the second tier. Also, at block 330, method 300 may enforce a register-transfer logic (RTL) policy that ensures a majority of combinational logic associated with the timing paths is co-located on a same tier as the launch sequential elements or the capture sequential elements in the first tier or the second tier.

In some implementations, the launch sequential elements in the first tier include one or more launch sequential components (e.g., latches, flip-flops, memory, etc.) in the first tier, and the capture sequential elements in the second tier include one or more capture latches in the second tier. Also, the timing paths may include a first timing path that spans across the multiple tiers from the launch latches in the first tier to the capture latches in the second tier. In some instances, the launch sequential elements in the second tier may include one or more launch latches in the second tier, and the capture sequential elements in the first tier include one or more capture latches in the first tier. Also, the timing paths may include a second timing path that spans across the multiple tiers from the launch latches in the second tier to the capture latches in the first tier.

In some implementations, the combinational logic may include first combinational logic in the first tier, and the combinational logic may include second combinational logic in the second tier. In some instances, method 300 may move part of the first combinational logic from the first tier to the second tier so as to ensure that the majority of combinational logic associated with the timing paths is co-located on the same tier as the launch sequential elements or the capture sequential elements in the first tier or the second tier. Also, in some instances, method may move part of the second combinational logic from the second tier to the first tier to ensure that the majority of combinational logic associated with the timing paths is co-located on the same tier as the launch sequential elements or the capture sequential elements in the first tier or the second tier.

FIG. 4 illustrates a diagram of a method 400 for providing multi-dimensional (3D) network connection architecture in accordance with implementations described herein.

It should be understood that even though method 400 indicates a particular order of operation execution, in some cases, various portions of operations may be executed in a different order, and on different systems. In other cases, additional operations and/or steps may be added to and/or omitted from method 400. Also, method 400 may be implemented in hardware and/or software. For instance, if implemented in hardware, method 400 may be implemented with components and/or circuitry, as described in FIGS. 1A-1B, 2-3. In other instances, if implemented in software, method 400 may be implemented as a program or software instruction process that is configured for providing multi-dimensional (3D) network connection architecture, as described herein. Also, if implemented in software, instructions related to implementing method 400 may be stored in memory and/or a database. Therefore, in various implementations, a computer or various other types of computing devices with a processor and memory may be configured to perform method 400.

As described in reference to FIG. 4, the method 400 may be used for fabricating and/or manufacturing, or causing to be fabricated and/or manufactured, an integrated circuit (IC) that implements various layout schemes and techniques in physical design as described herein so as to thereby provide multi-dimensional (3D) network connection architecture using various related devices, components and/or circuitry as described herein.

At block 410, method 400 may provide an integrated circuit with multiple tiers including a first tier and a second tier that are arranged vertically in a stacked configuration, wherein the first tier may include first functional components, and wherein the second tier may include second functional components. Also, at block 420, method 400 may provide a communication network with network lanes within a first tier that may allow for synchronous signaling between the first functional components and the second functional components for reducing latency between the multiple tiers including the first tier and the second tier. Further, at block 430, method 400 may manufacture, or cause to be manufactured, the integrated circuit with the multiple tiers and the communication network.

In some implementations, the first functional components may include a network router, and also, the second functional components may include a network multiplexer that concentrates multiple network ports into a single network port. Also, in some instances, the synchronous signaling meets timing constraints over different conditions of different global process skew (or corners) associated with the first tier and the second tier including different process technology nodes (or generations).

In some implementations, the communication network may be implemented as a three-dimensional (3D) interface whereby a clock phase used to launch or capture network lane signals may be adjusted differently for the network lanes that are sensitive to latency according to a direction of communication. Also, the clock phase may be adjusted to increase a timing window available to timing paths associated with latency sensitive signals and compensate non-latency sensitive paths with design changes by inserting extra registers or synchronizers. Also, the clock phase may be adjusted by including tunable (or trimmable) timing delay circuitry that is tuned (or trimmed) based on inputs from at least one of process variation tables and 3D connection delay sensors. In various instances, the signals may include at least one of latency-sensitive transmit paths from the first functional components, latency-sensitive receive paths to the first functional components, non-latency-sensitive transmit paths from the first functional components, non-latency-sensitive receive paths to the first functional components and tier-confined local paths.

It should be intended that the subject matter of the claims not be limited to various implementations and/or illustrations provided herein, but should include any modified forms of those implementations including portions of implementations and combinations of various elements in reference to different implementations in accordance with the claims. It should also be appreciated that in development of any such implementation, as in any engineering or design project, numerous implementation-specific decisions should be made to achieve developers' specific goals, such as, e.g., compliance with system-related constraints and/or business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Described herein are various implementations of a device having an integrated circuit with multiple tiers including a first tier and a second tier that are arranged vertically in a stacked configuration. The first tier may have first functional components, and the second tier may have second functional components. The device may also have a three-dimensional (3D) connection within the first tier that allows for synchronous signaling between the first functional components and the second functional components for reducing latency between the multiple tiers including the first tier and the second tier.

Described herein are various implementations of a method. The method may provide an integrated circuit with multiple tiers including a first tier and a second tier arranged vertically in a stacked configuration, wherein launch sequential elements in the first tier correspond to capture sequential elements in the second tier, and wherein launch sequential elements in the second tier correspond to capture sequential elements in the first tier. The method may form timing paths that span across the multiple tiers between corresponding launch and capture sequential elements in the first tier and the second tier. The method may enforce a register-transfer logic (RTL) policy that ensures a majority of combinational logic associated with the timing paths is co-located on a same tier as the launch sequential elements or the capture sequential elements in the first tier or the second tier.

Described herein are various implementations of a method. The method may provide an integrated circuit with multiple tiers including a first tier and a second tier that are arranged vertically in a stacked configuration. The first tier may have first functional components, and the second tier may have second functional components. The method may provide a three-dimensional (3D) connection within the first tier that allows for synchronous signaling between the first functional components and the second functional components for reducing latency between the multiple tiers including the first tier and the second tier. The method may manufacture, or cause to be manufactured, the integrated circuit with the multiple tiers and the communication network.

Reference has been made in detail to various implementations, examples of which are illustrated in accompanying drawings and figures. In the following detailed description, numerous specific details are set forth to provide a thorough understanding of the disclosure provided herein. However, the disclosure provided herein may be practiced without these specific details. In various implementations, well-known methods, procedures, components, circuits and networks have not been described in detail so as not to unnecessarily obscure details of the embodiments.

It should also be understood that, although various terms first, second, etc. may be used herein to describe various elements, these elements should not be limited by these terms. These terms are only used to distinguish one element from another. For instance, a first element could be termed a second element, and, similarly, a second element could be termed a first element. Also, the first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and various other similar terms that indicate relative positions above or below a given point or element may be used in connection with various implementations of various technologies described herein.

While the foregoing is directed to implementations of various techniques described herein, other and further implementations may be devised in accordance with the disclosure herein, which may be determined by the claims that follow. Although the subject matter has been described in language specific to structural features and/or methodological acts, it is to be understood that the subject matter defined in the appended claims is not necessarily limited to the specific features or acts described above. Rather, specific features and/or acts described above are disclosed as example forms of implementing the claims.

What is claimed is:

1. A device comprising:
   an integrated circuit with multiple tiers including a first tier and a second tier arranged vertically in a stacked configuration, wherein the first tier has first functional components, and wherein the second tier has second functional components; and
   a three-dimensional (3D) connection at least partially disposed within the first tier that allows for synchronous signaling between the first functional components and the second functional components for reducing latency between the multiple tiers including the first tier and the second tier, wherein a clock phase used to launch or capture network lane signals of the 3D connection is configured to be adjusted differently for timing paths associated with the signals based on at least a direction of communication of the timing paths.

2. The device of claim 1, wherein the synchronous signaling meets timing constraints over different conditions of different global process skew (or corners) associated with the first tier and the second tier including different process technology nodes (or generations).

3. The device of claim 1, wherein:
   the 3D connection comprises a three-dimensional (3D) interface and a communication network having network lanes within the first tier; and
   the clock phase used to launch or capture the signals is further configured to be adjusted differently for the timing paths associated with the signals based on at least the direction of communication and a latency sensitivity of the timing paths.

4. The device of claim 3, wherein:
   the clock phase is configured to be adjusted to increase a timing window available to latency sensitive paths; and
   non-latency sensitive paths are configured to be compensated for by using one or more registers, one or more synchronizers, or combinations thereof.

5. The device of claim 3, wherein the clock phase is configured to be adjusted by including tunable (or trimmable) timing delay circuitry that is tuned (or trimmed) based on inputs from at least one of process variation tables and 3D interface delay sensors.

6. The device of claim 1, wherein the timing paths comprise at least one of latency-sensitive transmit paths from the first functional components, latency-sensitive receive paths to the first functional components, non-latency-sensitive transmit paths from the first functional components, non-latency-sensitive receive paths to the first functional components, and tier-confined local paths.

7. The device of claim 1, wherein:
   the first functional components comprise a network router; and
   the second functional components comprise a network multiplexer that concentrates multiple network ports into a single network port.

8. The device of claim 1, wherein:
   the multiple tiers include one or more additional tiers; and
   the 3D connection provides additional synchronous signaling between additional functional components in the one or more additional tiers for reducing the latency between the first tier, the second tier, and the one or more additional tiers.

9. A method comprising:
   providing an integrated circuit with multiple tiers including a first tier and a second tier arranged vertically in a stacked configuration, the first tier having first functional components, and the second tier having second functional components;
   providing a three-dimensional (3D) connection at least partially disposed within the first tier that allows for synchronous signaling between the first functional components and the second functional components for reducing latency between the multiple tiers including the first tier and the second tier, wherein a clock phase used to launch or capture network lane signals of the 3D connection is configured to be adjusted differently for timing paths associated with the signals based on at least a direction of communication of the timing paths; and
   manufacturing, or causing to be manufactured, the integrated circuit with the multiple tiers and the communication network.

10. The method of claim 9, wherein the synchronous signaling meets timing constraints over different conditions of different global process skew (or corners) associated with the first tier and the second tier including different process technology nodes (or generations).

11. The method of claim 9, wherein:
the 3D connection comprises a three-dimensional (3D) interface and a communication network having network lanes within the first tier; and
the clock phase used to launch or capture the signals is further configured to be adjusted differently for the timing paths associated with the signals based on at least the direction of communication and a latency sensitivity of the timing paths.

12. The method of claim 11, wherein:
the clock phase is configured to be adjusted to increase a timing window available to the timing paths associated with latency sensitive signals;
non-latency sensitive paths are configured to be compensated for by using one or more registers, one or more synchronizers, or combinations thereof;
the clock phase is configured to be adjusted by including tunable (or trimmable) timing delay circuitry that is tuned (or trimmed) based on inputs from at least one of process variation tables and 3D connection delay sensors; or
combinations thereof.

13. The method of claim 9, wherein the timing paths comprise at least one of latency-sensitive transmit paths from the first functional components, latency-sensitive receive paths to the first functional components, non-latency-sensitive transmit paths from the first functional components, non-latency-sensitive receive paths to the first functional components and tier-confined local paths.

14. The method of claim 9, wherein:
the first functional components comprise a network router; and
the second functional components comprise a network multiplexer that concentrates multiple network ports into a single network port.

* * * * *